(12) United States Patent
Schenk (10) Patent No.: US 8,085,887 B2
(45) Date of Patent: Dec. 27, 2011

(54) METHOD AND RECEIVER CIRCUIT FOR REDUCING RFI INTERFERENCE

(75) Inventor: Heinrich Schenk, Münich (DE)

(73) Assignee: Infineon Technologies AG, Munich (DE)

( * ) Notice: Subject to any disclaimer, the term of this patent is extended or adjusted under 35 U.S.C. 154(b) by 1785 days.

(21) Appl. No.: 11/241,833

(22) Filed: Sep. 30, 2005

(65) Prior Publication Data

US 2006/0083325 A1 Apr. 20, 2006

(30) Foreign Application Priority Data

Sep. 30, 2004 (DE) .................. 10 2004 047 718

(51) Int. Cl.
*H04J 3/16* (2006.01)
*H04L 27/00* (2006.01)
*H03K 5/159* (2006.01)

(52) U.S. Cl. .............. 375/346; 375/240.26; 375/240.29; 375/316; 370/465; 370/336; 370/497

(58) Field of Classification Search .......... 375/229–236, 375/147, 150, 152, 144, 240.26–240.29, 375/316, 340, 343, 285, 346, 349, 350; 370/336, 370/341, 343, 345, 431, 432, 441–442, 465, 370/497, 516, 542, 543, 544

See application file for complete search history.

(56) References Cited

U.S. PATENT DOCUMENTS

| | | | | |
|---|---|---|---|---|
| 5,479,444 | A | * | 12/1995 | Malkamaki et al. .......... 375/231 |
| 5,870,432 | A | * | 2/1999 | Kerckhove ................... 375/232 |
| 5,995,567 | A | * | 11/1999 | Cioffi et al. |
| 6,014,412 | A | * | 1/2000 | Wiese et al. |
| 6,035,000 | A | * | 3/2000 | Bingham |
| 6,404,806 | B1 | * | 6/2002 | Ginesi et al. .................. 375/222 |
| 6,404,830 | B2 | * | 6/2002 | Wiese et al. |
| 6,449,324 | B2 | * | 9/2002 | Wiese et al. |
| 6,456,673 | B1 | * | 9/2002 | Wiese et al. |

(Continued)

FOREIGN PATENT DOCUMENTS

DE 697 14 241 T2 * 2/2003

(Continued)

OTHER PUBLICATIONS

Fanucci, L., "VLSI Design of a Digital RFI Cancellation Scheme for VDSL Transceivers", Euromicro Symposium on Digital System Design 2004, pp. 182-189, (8 pages).*

(Continued)

*Primary Examiner* — David C. Payne
*Assistant Examiner* — Linda Wong
(74) *Attorney, Agent, or Firm* — Maginot, Moore & Beck (57) ABSTRACT

In a method for generating a compensation signal for the compensation of at least one RFI interference signal that, in a DMT transmission, is permanently superposed on a received DMT reception signal being divided into a multiplicity of channels at least one reference channel from the multiplicity of channels is provided. The multiplicity of channels comprise a first portion provided as data channels for the data transmission and a second portion which is an observation region unused for the data transmission. Channel-specific coefficients for at least one of the data channels to be compensated are provided. The channel-specific coefficients specify a correlation of the RFI interference signal being superposed on the respective data channel in respect of the reference channel. A compensation signal is generated by weighting and summing the received DMT reception signals with the channel-specific coefficients per DMT frame and for each data channel to be compensated.

27 Claims, 8 Drawing Sheets

U.S. PATENT DOCUMENTS

| | | | |
|---|---|---|---|
| 6,738,440 B1 * | 5/2004 | Isaksson et al. | |
| 7,428,270 B1 * | 9/2008 | Dubuc et al. | 375/316 |
| 2001/0026602 A1 * | 10/2001 | Wiese et al. | 375/350 |
| 2001/0028692 A1 * | 10/2001 | Wiese et al. | |
| 2002/0106035 A1 * | 8/2002 | Harikumar et al. | 375/316 |
| 2003/0063680 A1 * | 4/2003 | Nedic et al. | 375/260 |
| 2003/0203721 A1 * | 10/2003 | Berezdivin et al. | 455/126 |
| 2004/0083254 A1 * | 4/2004 | Schenk | |
| 2004/0091056 A1 * | 5/2004 | Harikumar et al. | 375/260 |
| 2005/0068886 A1 * | 3/2005 | Wang et al. | 370/210 |
| 2006/0146945 A1 * | 7/2006 | Chow et al. | 375/260 |

FOREIGN PATENT DOCUMENTS

| | | |
|---|---|---|
| DE | 698 11 716 T2 * | 12/2003 |
| DE | 102 45 282 A1 * | 4/2004 |
| WO | WO 01/95580 A2 * | 12/2001 |
| WO | WO 03/039088 A1 * | 5/2003 |
| WO | WO 03049396 A2 * | 6/2003 |

OTHER PUBLICATIONS

Schwarz et al., "Detection and Compensation of Narrowband Interference for Wireline Multi-Carrier Modulator Systems", First International Symposium on Control, Communications and Signal Processing 2004, pp. 377-390, (4 pages).*

Nilsson et al., "A Narrow-Band Interference Canceller for OFDM-based Systems", Proceedings of the $4^{th}$ European Personal Mobile Conununications Conference, Vienna, Feb. 2001, pp. 1-8, (8 pages).*

* cited by examiner

FIG 8A a — without compensation
b — with compensation, one reference channel
c — with compensation, one reference channel, modified

FIG 8B

METHOD AND RECEIVER CIRCUIT FOR REDUCING RFI INTERFERENCE

BACKGROUND OF THE INVENTION

1. Field of the Invention

The invention relates to a method and a receiver circuit for reducing RFI interference in a DMT data transmission.

2. Description of the Related Art

High-bit-rate data transmission on a subscriber line is increasingly becoming more important in modern telecommunications, particularly because it is anticipated to yield a larger useable bandwidth of the data to be transmitted combined with bidirectional data communication.

One technique which has recently been gaining more and more in importance is so-called multicarrier data transmission, also known as "Multicarrier" transmission, as "Discrete Multi-tone" transmission (DMT) or as "Orthogonal Frequency Division Multiplexing" transmission (OFDM). DMT transmission is suitable particularly for data transmission via linearly distorted channels. Compared with single-carrier data transmission, advantages are also afforded with regard to flexibility in adapting the data rate or the transmission spectrum to the transmission channel or to the interference environment. DMT transmission is used for example in conductor-based systems, but also in the field of radio, for broadcast systems and for access to data networks. Examples of applications of DMT transmission are digital radio broadcasting (DAB=Digital Audio Broadcast) and digital television (DVB=Digital Video Broadcast).

One representative of DMT transmission is the ADSL technique, for example, where ADSL stands for "Asymmetric Digital Subscriber Line", that is to say asymmetric digital subscriber access connection via a normal telephone line. ADSL denotes a technique that permits the transmission of a high-bit-rate bit stream from a central station to a subscriber and of a low-bit-rate bit stream passing from the subscriber to a central station. This technique involves subdividing the telecommunication line into at least one channel for conventional telephone services (that is to say voice transmission) and at least one further channel for data transmission. In addition to the ADSL technique there are also further representatives of the so-called xDSL technique, thus for example broadband subscriber access connection (VDSL=Very High Speed Digital Subscriber Line).

DMT transmission systems use a multiplicity of carrier frequencies, the data stream to be transmitted being decomposed into many parallel partial streams that are transmitted by frequency division multiplexing. These partial streams are also referred to as individual carriers. For the modulation, the transmission signal is composed of many sinusoidal signals, each individual sinusoidal signal being modulated both in terms of amplitude and in terms of phase. A multiplicity of quadrature-amplitude-modulated signals are thus obtained. For DMT transmission, an IFFT transformation is used in the transmitter and an FFT transformation is used in the receiver. Efficient and fast signal processing algorithms exist both for the IFFT and for the FFT.

One problem that is primarily associated with very broadband DMT transmission results from the fact that the useable frequency range extends to above 12 MHz or more. This wide frequency range, however also contains frequency bands for other services such as, for example, the frequency bands for medium-wave and short-wave radio broadcasting or the frequency ranges for amateur radio. Depending on the spatial position, the subscriber terminals of DMT transmission may be disturbed by these services that use the same frequency range of DMT transmission. The term employed here is so-called RFI interference, where RFI stands for "Radio Frequency Interference". This RFI interference represents narrowband interferences relative to the very broadband frequency range utilized for DMT transmission, since these interfering RFI frequency ranges typically have a width of just a few kilohertz.

If such a narrowband interference signal is superposed on the DMT reception signal, the demodulated DMT reception signal is then adversely affected thereby. Not only the values (carrier frequencies) in the immediate vicinity of the centroid frequency of this interference are disturbed in this case. Carrier frequencies (or useful channels) of the DMT reception signal that are much further away from this interference frequency are also disturbed.

This shall be explained on the basis of an example in the case of a VDSL data transmission and an assumed purely sinusoidal interference having the frequency $f_0=1211.1$ kHz. The DMT receiver demodulates the received DMT reception signal with the aid of an FFT transformation. In accordance with the VDSL standard, the frequency spacing of the individual synchronous carrier frequencies is precisely $\Delta f=4.3125$ kHz. The interference frequency $f_0$ thus corresponds to none of the carrier frequencies used in the DMT transmission, that is to say that the interference frequency is asynchronous with respect to the carrier frequencies of the DMT transmission.

Figure 1:
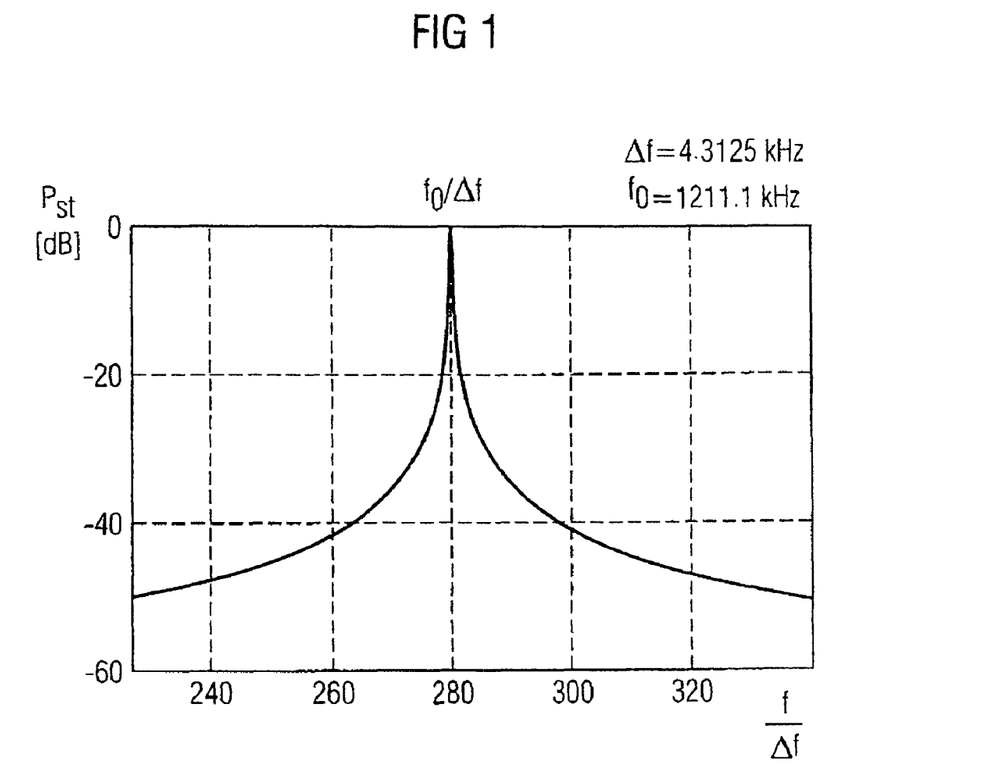
FIG. 1 shows the normalized power density of an asynchronous interference signal after demodulation relative to the maximum value of the interference.

FIG. 1 shows the normalized power density Pst of an interference signal having the frequency $f_0=1211.1$ kHz after the FFT demodulation in the vicinity of the normalized interference frequency $f_0/\Delta f \approx 281$ as a function of the carrier frequency f. The carrier frequency f is normalized here to the frequency spacing $\Delta f$. FIG. 1 illustrates the resulting interference spectrum—normalized to the maximum value of the interference frequency $f_0/\Delta f$—in dB. It is evident that, without further measures, the interference spectrum has decayed by approximately 50 dB below and above the interference frequency $f_0/\Delta f$ only after approximately 50 carrier frequencies ($f/\Delta f$). This means that useful channels of the DMT reception signal which are relatively far away from the centroid frequency $f_0/\Delta f$ of the interference signal relative to the bandwidth of the interference signal are still disturbed by precisely this interference. This is due to the fact that the narrowband interference signal is typically not present orthogonally or synchronously with respect to the carrier frequencies utilized for the transmission and is thus not completely eliminated either.

The RFI interference, as already mentioned above, comprises relatively narrowband interferences attributable for example to radio broadcasting waves or to amateur radio waves. In medium-wave or short-wave radio broadcasting, the transmitted signals are modulated with the aid of double-sideband amplitude modulation with carriers and emitted. Consequently, a permanent interference having a constant centre frequency is to be reckoned with here (interference of a first type). By contrast, amateur radio involves the use of single-sideband amplitude modulation with a suppressed carrier. Therefore, no permanent interference occurs here (interference of a second type). Rather, the interference here is dependent on the amateur radio transmitter, that is to say the speaker.

The article "A Narrow-Band Interference Canceller for OFDM-based Systems" from Rickard Nilsson, Frank Sjöberg and James P. Leblanc in Proceedings of 4th European Personal Mobile Communications Conference (EPMCC 2001), Vienna, 17-22 February 2001, describes a method for solving this problem. This method deals with the occurrence both of interference of the first type and of interference of the second type. In the method described therein, it is assumed that the carrier frequencies in the immediate vicinity of the interference frequency, in the so-called observation interval, are not utilized for the data transmission. For this purpose, after the FFT demodulation in the receiver, firstly the precise spectral position of the interference signal is determined. By means of suitable processing of the complex frequency values in the observation interval in which the interference frequency is also situated and which contains no portions of the useful signal, it is possible to generate a compensation signal in the form of a complex signal vector. This complex signal vector is subsequently subtracted from the demodulated signal vector of the data transmission.

In the case of this method, however, generating the compensation signal presupposes exact a priori information about the received interference signal, for example in the form of a spectral power density of the interference signal that is as exact as possible and is determined or known at the outset. Furthermore, knowledge that is as accurate as possible about the type and the profile, that is to say the form, of the interference signal is required, that is to say whether the interference is sinusoidal, for example. This method then attempts to simulate the profile of the interference outside the observation interval as accurately as possible, which is very complicated if only for this reason. This means, however, that the applicability, the performance and thus the usefulness of this known method are significantly restricted. Moreover, the realization and implementation of this method requires an exorbitantly high outlay on hardware and software for determining the a priori information and also for calculating the corresponding compensation signals.

SUMMARY OF THE INVENTION

It is an object of the present invention to reduce RFI interference relatively effectively, relatively rapidly and in a relative simple manner.

The object is achieved in accordance with the invention by means of a method for compensating at least one RFI interference signal that is permanently superposed on a received DMT reception signal in a DMT transmission, in which the DMT reception signal is divided into a multiplicity of channels of which a first portion is provided as the data channels for the data transmission and a second portion defines an observation region provided for data transmission, in which the following method steps are performed for generating a compensation signal for the compensation of the RFI interference signal:

(a) provision of at least one reference channel from the multiplicity of channels;
(b) provision of channel-specific coefficients for at least one data channel to be compensated, which specify a correlation of the RFI interference signal superposed on a respective data channel relative to a respective reference channel;
(c) for the generation of a compensation signal, per DMT frame for each useful channel to be compensated, the reception signals of the reference channels are weighted with the channel-specific coefficients and summed.

The object of the present invention is also achieved by means of a receiver circuit for a DMT data transmission system, having a reception circuit for receiving a transmitted data signal; having an FFT device, which is connected downstream of the reception circuit and subjects the DMT reception signal to an FFT for the purpose of attaining spectral values; having an RFI compensator, which is connected downstream of the FFT device and carries out a compensation of an interference signal superposed on the received data signal, by means of the above-mentioned inventive method.

The idea on which the present invention is based consists in the fact that preferably interference of the above-mentioned first type, that is to say permanent interference, is compensated for or at least significantly reduced, but without the invention being exclusively restricted thereto. Overall, it is thereby possible to utilize a substantially greater part of the available frequency range and thus to increase the data rate.

In a manner similar to that in the case of known methods, here as well the carrier frequencies in the vicinity of the interference frequency are typically not used for the data transmission. The values that result after the demodulation (FFT) in these frequency channels are thus largely caused by the RFI interference itself. These unused channels may then represent the reference channels for the RFI compensator according to the invention.

The idea on which the present invention is based consists in the fact that for the generation of a compensation signal for compensating for or reducing an interference signal, for each data channel to be compensated, the signals of at least a single reference channel, real and imaginary parts separately in each case, are weighted with corresponding channel-specific coefficients and summed. In this case, the weighting coefficients are designated according to a predefined scheme.

The real and imaginary parts may in each case be treated separately for the generation of the compensation signal.

In a restricted version of the inventive method, the channel-specific coefficients are assigned, according to a fixedly predefined designation scheme, to the respective real part and imaginary part of the useful channel to be compensated, depending on the real part and imaginary part of the respective reference channel.

The channel-specific coefficients may be determined directly from the reception signal or may be derived therefrom during a test operating mode in which no data may be transmitted and received. Alternatively, the channel-specific coefficients may also be determined adaptively during a current data transmission.

Four channel-specific coefficients may, in each case, be determined and correspondingly stored in a memory for each used channel to be compensated.

In a further restricted version of the inventive method, a single reference channel is provided for all data channels to be compensated. Preferably, for the generation of the compensation signals, a plurality of unused channels from the observation region are combined to form the single reference channel. In this case, typically only reference channels from the observation region are used.

In a further restricted version of the inventive method, an adjacent channel of the data channel to be compensated is in each case used as a reference channel for generating the compensation signals. Preferably, a data channel is used as a reference channel in this case. The interference component of this reference channel that is required for the correction is generated with the aid of a decision unit, which estimates the compensated reception signal of this reference channel, and is subtracted from the non-compensated frequency-equalized reception signal of this reference channel.

The compensation signals may be calculated anew for each DMT frame.

The compensation signals may be subtracted from the complex reception signal superposed with the interference signal, in order to generate the compensated reception signal therefrom.

The compensation signals may be calculated only for those data channels to be compensated outside the observation interval in the case of which the absolute value of the interference power density of the interference signal and/or of the compensation signals lies above a predefined threshold. Typical values for the predefined threshold lie in the range of between 60 dB and 45 dB, in particular at approximately 50 dB.

The width of the observation interval used may be chosen in a manner dependent on the type of interference signal and/or on the type of windowing used.

The width of the observation interval used may be adjustable.

DESCRIPTION OF THE PREFERRED EMBODIMENT

In all the Figures of the drawing, identical and functionally identical elements, signals and functions have been provided with the same reference symbols, unless specified otherwise.

Figure 2:
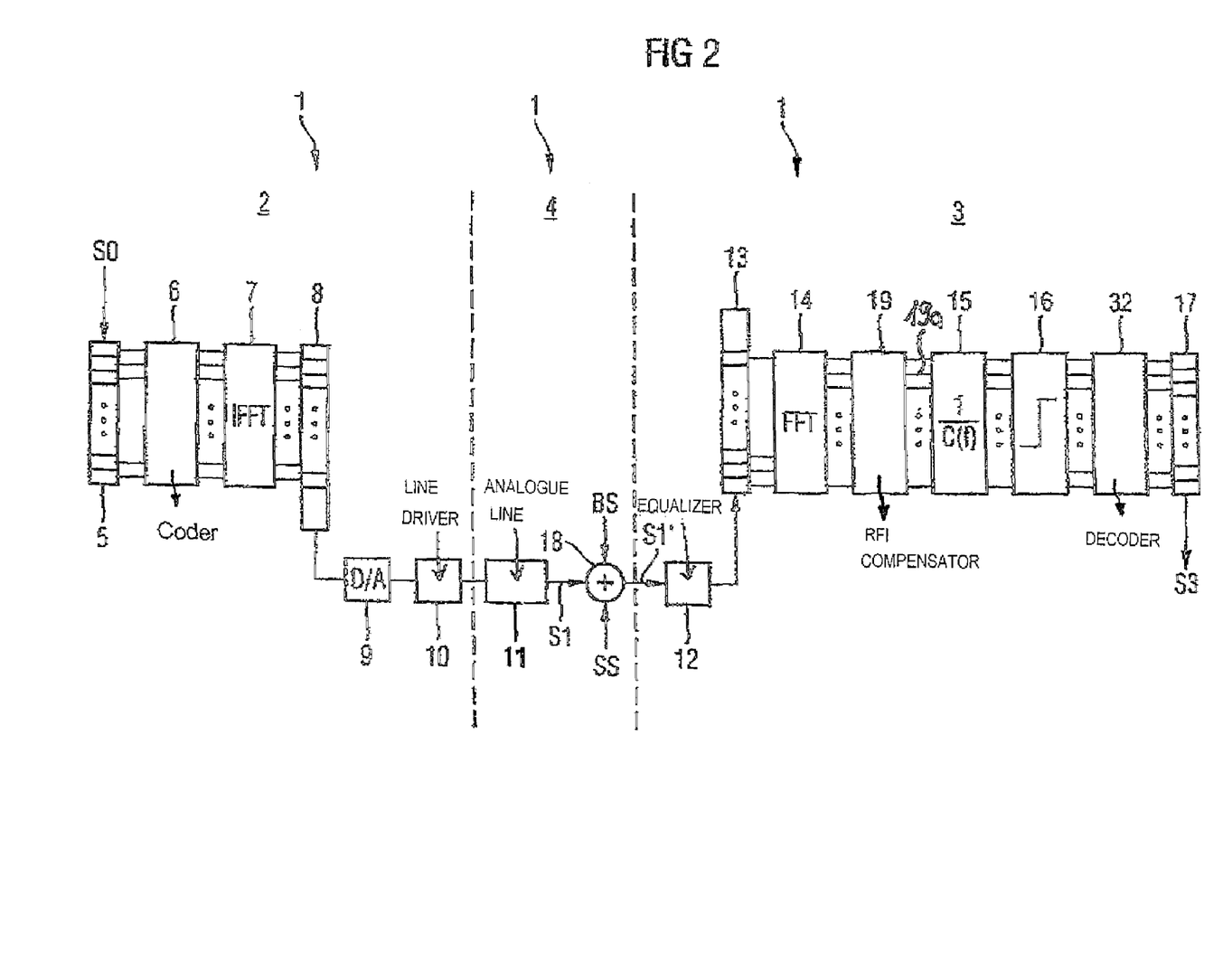
FIG. 2 shows a basic block diagram of a DMT transmission system according to the invention.

FIG. 2 shows a block diagram of a DMT transmission system according to the invention.

In FIG. 2, reference symbol 1 designates the DMT transmission system according to the invention, it being assumed hereafter that the DMT transmission system 1 is a so-called VDSL transmission system 1. The DMT data transmission system 1 comprises a transmitter-end part 2, a receiver-end part 3 and also a data transmission link 4 arranged between transmitter 2 and receiver 3. The transmitter 2 and also the receiver 3 may be subscriber terminals, for example, such as, by way of example, an analogue or digital telephone, a PC, a modem or the like. Even though only the transmission path is illustrated at the transmitter 2 and only the reception path is illustrated at the receiver 3, it goes without saying that they may, if appropriate, additionally also have a reception path and a transmission path, respectively. These have not been illustrated in FIG. 2, however, for the sake of clarity.

In the present exemplary embodiment, the transmitter 2 has a serial/parallel converter 5, to which the data signals S0 to be transmitted are applied on the input side. Arranged in a manner connected downstream of the serial/parallel converter 5 are, one after the other, a coder 6, an IFFT block 7, a parallel/serial converter 8, a digital/analogue converter 9 and a line driver 10. In this case, the line driver 10 forms the transmitter-end physical interface of the transmitter 2 with respect to the data transmission link 4, which essentially has an analogue line 11, also referred to as a channel. After coding, that is to say at the output of the coder 6, the data to be transmitted are present in the form of frequency points. The latter are subjected to an inverse Fast Fourier Transformation in the IFFT block 7 and are subsequently converted into a serial data stream in the parallel/serial converter 8.

The receiver 3 has an equalizer 12 on the input side, said equalizer forming the receiver-end physical interface with respect to the data transmission link 4. Connected downstream of the equalizer 12, on the output side, are a serial/parallel converter 13, an FFT block 14, an equalizer 15, a decision unit 16, a decoder 32 and also a parallel/serial converter 17. The equalizer 15 performs an equalization of the received data signals in the frequency domain and, since the data transmission is typically not ideal, the decision unit 16 connected downstream performs an assignment of the correct data values. On the output side of the parallel/serial converter 17, the received data signals S2 are then present in correspondingly conditioned serial form.

It should be noted at this juncture that the construction of the transmitter 2 and of the receiver 3 has merely been illustrated schematically in FIG. 2 and does not lay claim to completeness. In particular, it goes without saying that a transmitter 2 may additionally have, on the output side of the IFFT device 7, a transmission filter and, if appropriate, a circuit arrangement for crest factor reduction and that an analogue filter may be provided, if appropriate, downstream of the digital-to-analogue converter 9. Moreover, an analogue filter, an analogue-to-digital converter, an addition device and also a reception filter are typically provided directly downstream of the equalizer 12 in the receiver 3.

The data signal 1 which is transmitted via the channel 11 and is intended to correspond to the data signal S0 coupled in on the input side is typically superposed with an interference signal of greater or lesser intensity. In the example shown, said interference signal may be a narrowband interference signal SS and/or a broadband interference signal BS. These interference signals BS, SS are superposed on the transmitted data signal S1 in the channel 11, which is indicated by the block 18 in FIG. 2. The transmitted data signal S1' coupled into the equalizer 12 is thus superposed with an interference signal BS, SS in comparison with the signal S1 output on the output side of the line driver 10.

In order at least to reduce or ideally to completely compensate for this interference signal BS, SS in the receiver 3, the receiver 3 has a compensation device 19 according to the invention. It is typically the case here that 100% compensation is not effected, but rather merely a reduction of the influence of the interference signal BS, SS.

In the present exemplary embodiment, the compensation device 19, which is referred to as hereinafter as RFI compensator 19 for short, is arranged in a manner connected directly downstream of the FFT block 14, but it would also be conceivable for the RFI compensator 19 to be connected downstream of the equalizer 15. A possible construction and the functioning of said RFI compensator 19 are described in detail below.

Figure 3:
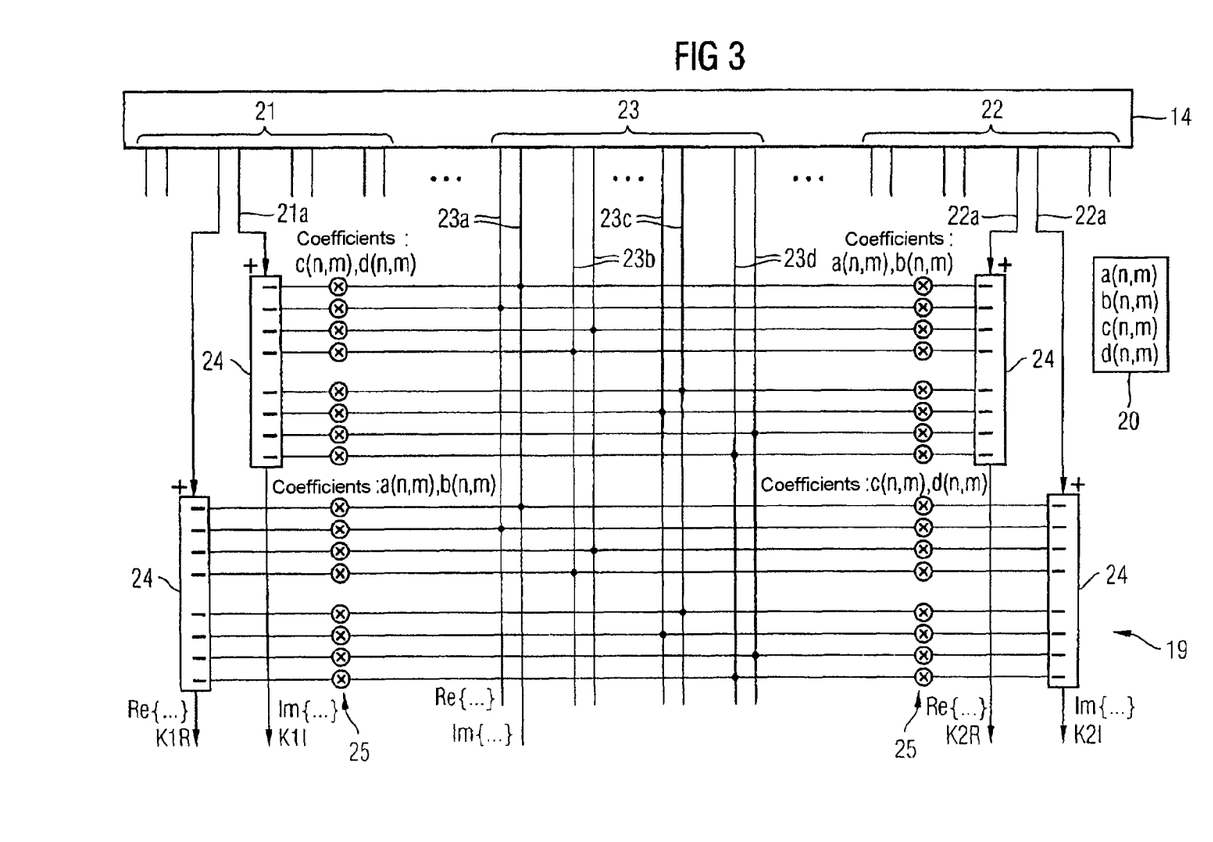
FIG. 3 shows a block diagram for a first exemplary embodiment of an RFI compensator according to the invention.

FIG. 3 shows the basic circuit diagram for an RFI compensator according to the invention, on the basis of which the RFI compensation according to the invention will be explained below. The double lines depicted in FIG. 3 are intended to illustrate that the respective signals are complex signals comprising a real part and an imaginary part.

The RFI compensator 19 has a storage device 20, in which are stored channel-specific coefficients a (n, m)-d (n, m) for the individual channels of the received data signal. Four of these coefficients a (n, m)-d (n, m) are in each case provided here per useful channel 21, 22. These coefficients a (n, m)-d (n, m) provide a correlation between the interference signal and the actual data signal on which said interference signal is superposed in order to determine the compensation signals. Consequently, four channel-specific coefficients a (n, m)-d (n, m) are in each case stored for each useful channel 21, 22 to be compensated in the storage device 20. The determination of these coefficients a (n, m)-d (n, m) in a test phase or training phase in which no data transmission takes place, rather just the interference signal is recorded, will be described in greater detail below.

In FIG. 3, the RFI compensator 19 is connected downstream of the FFT block 14, so that the signals of the different channels are fed in on the input side in the case of the RFI compensator 19. In this case, reference symbol 23 designates the reference channels in the observation region, reference symbol 21 designates the useful channels below this observation region 23, and reference symbol 22 designates the useful channels above the observation region 23.

In FIG. 3, for the sake of better clarity, whilst illustrating the function of the RFI compensator 19, only one useful channel 21a below the observation region 23 and one useful channel 22a above the observation region 23 have been illustrated, but without restricting the invention to the use of a single useful channel 21a, 21b in each case. Each of these useful channels 21a, 22a is assigned in each case two combination devices 24, in each case one combination device for the real part and one combination device for the imaginary part of the respective useful channel 21a, 22a. In these combination devices, which are formed as subtraction devices here, the received signal of this channel is combined with a signal which is derived from the signal of the reference channels 23a-23d and has been weighted with a coefficient a(n, m)-d(n,m).

Four reference channels 23a-23d of the observation region 23 are illustrated by way of example in the present exemplary embodiment, but it is also possible to provide more or fewer reference channels 23a-23d.

In order to determine the compensation signals, the reference channels 23a-23d in the observation region 23 contain no data signals whatsoever, that is to say that merely the (permanent) interference signal is applied to them. The interference signal or a measure of the interference signal in the useful channel 21a, 22a respectively considered is then derived from said reference channels 23a-23d using the coefficients a(n,m)-d(n,m). For this purpose, the value of a respective reference channel 23a-23d, divided into imaginary part and real part, is multiplied—in a respective multiplication device 25—by the respective channel-specific coefficient a(n, m)-d(n,m) and summed in the respective subtraction devices 24, that is to say subtracted from the respective real part or imaginary part of the reception signal of the corresponding useful channel 21a, 22a. Consequently, a compensated partial signal K1R, K1I; K2R, K2I, broken down into the respective real part K1R, K2R and imaginary part K1I, K2I, is in each case produced per useful channel 21, 22.

The assignment of the respective coefficients a(n,m)-d(n, m) by which the values of the respective reference channel 23a-23d are multiplied in the multiplication device 25 is described on the basis of the assignment scheme in Table 1 below. The channel-specific weighting coefficients a(n,m) b(n,m), c(n,m), d(n,m) are designated according to the designation scheme specified in Table 1 below.

TABLE 1

| | | Reference channel n | |
|---|---|---|---|
| | | Real part | Imaginary part |
| Channel m to be compensated | Real part | a (n, m) | b (n, m) |
| | Imaginary part | c (n, m) | d (n, m) |

For setting the RFI compensator 19 and thus for determining the channel-specific weighting coefficients a(n,m), b(n, m), c(n,m), d(n,m), firstly use is made of a setting phase (test phase), for example before the beginning of the data transmission or in pauses in the data transmission, i.e. during which no useful data are transmitted and received. In this setting phase, therefore, only interference signals of the first type (permanent interference) are received, since they are present permanently, that is to say even when no data transmission takes place. During said setting phase, the procedure involves firstly testing whether a narrowband interference signal is actually present. This is the case if, after the FFT transformation in the receiver, one or more absolute-value maxima are ascertained at specific frequency values in each FFT frame. In this setting phase, it is possible, therefore, to tap off the effects of a narrowband interference on all the frequency channels, that is to say on the useful channels 21, 22 and the reference channels 23, directly after the FFT transformation and thereby to determine all the weighting coefficients a(n,m) b(n,m), c(n,m), d(n,m) for the RFI compensator 19.

Consequently, the test phase involves specifying the correlation of an interference signal within the observation interval 23 and the effects of said interference signal on the useful channels 21, 22 outside the observation interval 23. In the subsequent data transmission phase, this known correlation is used to determine a compensation signal from the known correlation or the weighting coefficients a(n,m) b(n,m), c(n, m), d(n,m) determined, which compensation signal corresponds to the permanent interference signal that is superposed on the data signal in the respective useful channels. The compensation signals are thus derived directly from the transmitted data signal, superposed with an interference signal, with the known correlation being taken into account.

It shall now be assumed that an absolute-value maximum at the frequency number $i_0$, originating from a narrowband interference, was detected (but without restricting the invention in this regard). Firstly, the observation region is defined, which is not permitted to be occupied with data during operation and which therefore contains the frequencies of the unused reference channels (useful channels). Said observation region ranges from the frequency $i_0-\Delta$ up to the frequency $i_0+\Delta$. For the observation region $n=2\cdot\Delta+1$, therefore, frequency values are used as reference channels. In this case, the value $\Delta$, which defines the number of reference channels above and below the absolute-value maximum at the location $i_0$, may be made dependent on the magnitude of the detected absolute-value maximum, that is to say on the strength of the interference. The values of the reference channels in the FFT frame k are designated below by $$X_k(\mu)+j\cdot Y_k(\mu) \text{ where } \mu=i_0-\Delta,\ldots,i_0,\ldots,i_0+\Delta$$

In which case $X_k(\mu)$ denotes the real part and $Y_k(\mu)$ denotes the imaginary part.

A calculation specification as to how the weighting coefficients a(n,m), b(n,m), c(n,m), d(n,m) can be derived from the recorded signal during test operation is specified below. In this case, m designates an arbitrary compensation channel (or useful channel 21, 22) outside the observation region 23. A total of M received FFT frames are considered for the calculation specification. Furthermore, two systems of equations are in each case established for calculating the coefficients for a respective compensation channel 21, 22.

What is intended to be applicable in the first system of equations is that multiplication of the frequency values (real and imaginary parts) of the reference channels by the initially still unknown coefficients and summation yields the real part of the channel m to be compensated. Matching with the imaginary part of the corresponding channel m is intended to be applicable in the second system of equations.

Accordingly, for calculating the unknown coefficients $$a(i_0-\Delta, m), b(i_0-\Delta, m), a(i_0-\Delta+1, m), b(i_0-\Delta+1, m), \ldots a(i_0+\Delta, m), a(i_0+\Delta, m)$$

the following results for the first system of equations $$\begin{bmatrix} X_1(i_0-\Delta) & Y_1(i_0-\Delta) & X_1(i_0-\Delta+1) & Y_1(i_0-\Delta+1) & \ldots & X_1(i_0+\Delta) & Y_1(i_0+\Delta) \\ X_2(i_0-\Delta) & Y_2(i_0-\Delta) & X_2(i_0-\Delta+1) & Y_2(i_0-\Delta+1) & \ldots & X_2(i_0+\Delta) & Y_2(i_0+\Delta) \\ \vdots & \vdots & \vdots & \vdots & & \vdots & \vdots \\ X_M(i_0-\Delta) & Y_M(i_0-\Delta) & X_M(i_0-\Delta+1) & Y_M(i_0-\Delta+1) & \ldots & X_M(i_0+\Delta) & Y_M(i_0+\Delta) \end{bmatrix} \cdot \begin{bmatrix} a(i_0-\Delta, m) \\ b(i_0-\Delta, m) \\ a(i_0-\Delta+1, m) \\ b(i_0-\Delta+1, m) \\ \vdots \\ a(i_0+\Delta, m) \\ b(i_0+\Delta, m) \end{bmatrix} = \ldots \cdot \ldots = \begin{bmatrix} X_1(m) \\ X_2(m) \\ \vdots \\ X_M(m) \end{bmatrix}$$

and, for calculating the unknown coefficients, $$c(i_0-\Delta, m)\ d(i_0-\Delta, m)\ c(i_0-\Delta+1, m)\ d(i_0-\Delta+1, m) \ldots c(i_0+\Delta, m)\ d(i_0+\Delta, m)$$

the following system of equations results $$\begin{bmatrix} X_1(i_0-\Delta) & Y_1(i_0-\Delta) & X_1(i_0-\Delta+1) & Y_1(i_0-\Delta+1) & \ldots & X_1(i_0+\Delta) & Y_1(i_0+\Delta) \\ X_2(i_0-\Delta) & Y_2(i_0-\Delta) & X_2(i_0-\Delta+1) & Y_2(i_0-\Delta+1) & \ldots & X_2(i_0+\Delta) & Y_2(i_0+\Delta) \\ \vdots & \vdots & \vdots & \vdots & & \vdots & \vdots \\ X_M(i_0-\Delta) & Y_M(i_0-\Delta) & X_M(i_0-\Delta+1) & Y_M(i_0-\Delta+1) & \ldots & X_M(i_0+\Delta) & Y_M(i_0+\Delta) \end{bmatrix} \cdot \begin{bmatrix} c(i_0-\Delta, m) \\ d(i_0-\Delta, m) \\ c(i_0-\Delta+1, m) \\ d(i_0-\Delta+1, m) \\ \vdots \\ c(i_0+\Delta, m) \\ d(i_0+\Delta, m) \end{bmatrix} =$$

$$\ldots = \begin{bmatrix} Y_1(m) \\ Y_2(m) \\ \vdots \\ Y_M(m) \end{bmatrix}$$

The two systems of equations may be represented in a compact manner as follows:

$$\underline{\underline{XY}} \cdot \underline{ab} = \underline{X}$$

and $$\underline{\underline{XY}} \cdot \underline{cd} = \underline{Y}$$

In this case, the underlined symbols represent matrices or vectors.

The number of equations and thus the number of FFT frames considered is intended, then, to be much greater than the number of unknown coefficients, that is to say greater than $2 \cdot n$. In this case, the coefficients can be calculated according to the criterion of the least square error, and the following is obtained:

$$\underline{ab} = (\underline{\underline{XY}}^T \cdot \underline{\underline{XY}})^{-1} \cdot \underline{\underline{XY}}^T \cdot \underline{X}$$

and also $$\underline{cd} = (\underline{\underline{XY}}^T \cdot \underline{\underline{XY}})^{-1} \cdot \underline{\underline{XY}}^T \cdot \underline{Y}$$

or $$\underline{ab} = \underline{\underline{A}} \cdot \underline{X}$$

and also $$\underline{cd} = \underline{\underline{A}} \cdot \underline{Y}$$

In this case, the superscript T represents the transposing operator.

The coefficients for the RFI compensator are obtained with the aid of a multiplication of the matrix A comprising M columns and $2 \cdot n$ rows by the vector $\underline{X}$ and, respectively, by the vector $\underline{Y}$ with in each case M elements. The coefficients of the matrix A can be calculated from the values of the reference channels with the aid of the relationship $$\underline{\underline{A}} = (\underline{\underline{XY}}^T \cdot \underline{\underline{XY}})^{-1} \cdot \underline{\underline{XY}}^T$$

The elements of the vectors $\underline{X}$ and $\underline{Y}$ directly represent the real part values and the imaginary part values, respectively of the frequency channel of the corresponding FFT frames that is to be compensated.

In the case of a purely sinusoidal interference, such as the interference illustrated in FIG. 1, for example, all of the interference signals of the useful channels can be completely compensated for by means of a single reference channel. In this case, only four real coefficients in each case are required for the compensation of each useful channel.

In the case of a noisy narrowband interference signal, although a complete compensation of the useful channels is not possible, the interference can be largely reduced here. In this case, the reduction depends on the noise signal or on the bandwidth of the noise signal and on the number of reference carriers. If only one reference carrier is used for determining the compensation signal, the quality and hence the quality factor of the compensation are lower, but the complexity for calculating the compensation signal is also significantly lower. As the number of reference carriers used rises, admittedly the quality of the compensation rises, but then the calculation complexity is also greater.

Investigations by the applicant have shown that a significant reduction of the RFI interference is already obtained even just with two reference carriers in the observation region, if for example the two carriers at the outermost edge of the observation region are used as reference carriers. As reference channel, the frequency channel $i_0-\Delta$ is used for the channels to be compensated below the centroid frequency and the frequency channel $i_0+\Delta$ is used for the channels above the centroid frequency. In this case, the interference suppression that can be obtained depends on the bandwidth of the interference and also on the size of the observation region, that is to say how many reference channels are assigned to the observation region. When using just two reference channels, it is also possible to significantly reduce the complexity both for the calculation of the compensator coefficients during the initialization phase and for the compensation during data operation.

An RFI compensator having only two reference channels is considered below. In this case, the channel $i_0-\Delta$ is selected as reference channel for the compensator for the useful channels below the centroid frequency of the narrowband interference and the channel $i_0+\Delta$ is selected as reference channel for the compensator for the useful channels above the centroid frequency. For this special case, the calculation specification for the coefficients is produced as follows.

The matrix $\underline{XY}$ is simplified to form a (M×2) matrix of the form $$\underline{XY} = \begin{bmatrix} X_1(i_{ref}) & Y_1(i_{ref}) \\ X_2(i_{ref}) & Y_2(i_{ref}) \\ \vdots & \vdots \\ X_M(i_{ref}) & Y_M(i_{ref}) \end{bmatrix}$$

The number of the reference channel may be either $i_0-\Delta$ or $i_0+\Delta$.

For the matrix $(\underline{XY}^T \cdot \underline{XY})$, a symmetrical (2×2) matrix is obtained which can be represented in the form $$(\underline{XY}^T \cdot \underline{XY}) = \begin{bmatrix} x_{1.1} & x_{1.2} \\ x_{2.1} & x_{2.2} \end{bmatrix}$$

The matrix elements result as $$x_{1.1} = \sum_{k=1}^{M} (X_k(i_{def}))^2,$$

$$x_{2.2} = \sum_{k=1}^{M} (Y_k(i_{def}))^2,$$

$$x_{1.2} = x_{2.1} = \sum_{k=1}^{M} (X_k(i_{def}) \cdot Y_k(i_{def}))$$

For the inverse matrix with respect thereto, the following is obtained $$(\underline{XY}^T \cdot \underline{XY})^{-1} = \frac{1}{x_{1.1} \cdot x_{2.2} - x_{1.2}^2} \begin{bmatrix} x_{2.2} & -x_{1.2} \\ -x_{1.2} & x_{1.1} \end{bmatrix}$$

The A matrix can firstly be calculated by means of a matrix multiplication. It is then possible to determine the unknown coefficient vectors ab and cd with two elements in each case. To an approximation, the two coefficient vectors are combined to form a complex coefficient. With the two coefficient vectors $$\underline{ab} = \begin{bmatrix} a \\ b \end{bmatrix},$$

$$\underline{cd} = \begin{bmatrix} c \\ d \end{bmatrix}$$

the following symmetry condition then results a=d, b=−c

The complex coefficient $y=a+j\cdot b=d-j\cdot c$ is thus obtained.

Therefore, a total of four real multiplications are required for the determination of the compensation signal for each useful channel. The calculation specification for the real and imaginary parts of the complex compensator coefficient can be specified by a system of equations that combines the two systems of equations for the real formulation.

Figure 4:
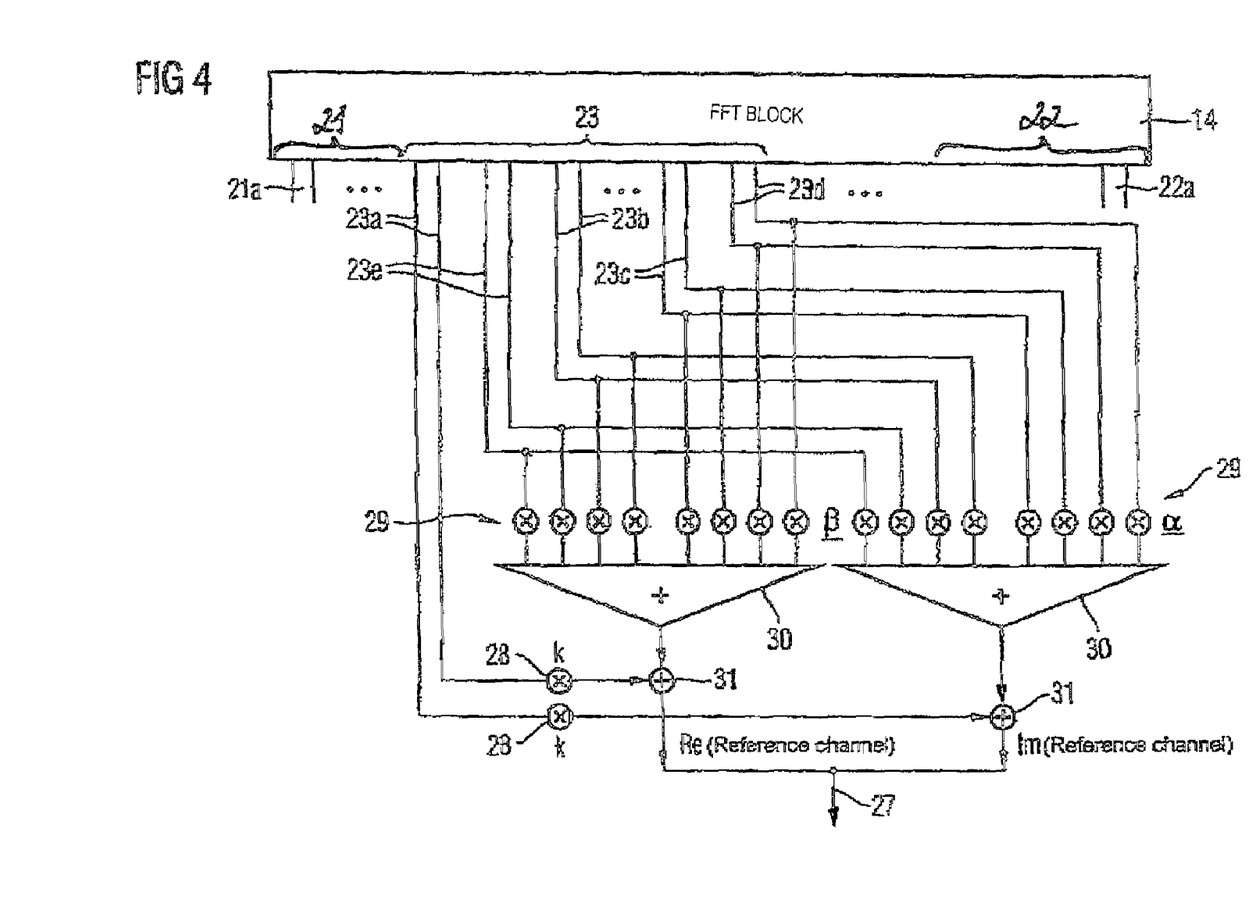
FIG. 4 shows a block diagram for a second exemplary embodiment of an RFI compensator according to the invention.

The RFI compensator 19 according to the invention can also be extended or modified. FIG. 4 shows a block diagram for a second exemplary embodiment for the generation of a single reference channel for the RFI compensator 19 according to the invention.

In this modification, the single reference channel 27 chosen is not simply a channel within the observation region 23, although this would likewise be conceivable and advantageous. Rather, said reference channel 27 is composed of a plurality or alternatively of all of the channels 23a-23d within the observation region 23. One realization for such an extended method is briefly described below.

An arbitrary channel 21a to be compensated, for example below the interference frequency, is considered in this case. Therefore, the compensation of a single useful channel 21a always requires four real multiplications. This reference channel 27 is composed of all of the channels 23a-23d of the observation region 23.

The generation of the reference channel 27 is firstly divided into two portions. The first portion consists only of an individual channel 23a of the observation interval 23, for example the channel 23a at the edge of the observation interval 23, that is to say the channel having the frequency number $i_0-\Delta$. In the case of the compensation of a channel 22a above the interference frequency, this is the channel having the frequency number $i_0+\Delta$. The second portion is composed of a weighted sum of the remaining channels 23b-23e of the observation region 23. In this case, the weighting factors $\alpha$ and $\beta$ are chosen so as to produce for the second portion a value of the channel which is used for the first portion. Said weighting factors $\alpha$ and $\beta$ are multiplied by the values of a respective channel 23b-23e in the multiplication devices 29 and combined to form a single value in an addition device 30, real and imaginary parts of the individual channels 23b-23e being treated separately here. For the generation of the single reference channel 27, the first portion is weighted with the weighting factor k in a respective multiplication device 28 and added to the second portion in an addition device 31, so that the imaginary part and the real part and hence the single reference channel 27 result therefrom, real and imaginary parts again having to be treated separately here, too.

An arrangement of this type makes it possible to significantly reduce the residual interference, even though only a single reference channel 27 is used. A somewhat increased complexity for the generation of the single reference channel 27 is required in this case, however.

The weighting coefficients α, β can be specified in an analogous manner—as is shown above for the calculation of a set of coefficients a(n,m)-d(n,m) for the compensation of a useful signal. These coefficients α, β can thus be calculated in the same way as the coefficients $\overline{a}$(n,m)-d(n,m) for the compensation of the useful channels 21, 22 during a test phase in which no data transmission takes place.

In addition or as an alternative, however, these weighting coefficients α, β can also be corrected during operation in the event of a change in the properties of the narrowband interference, since only the channels 23b-23d of the observation region 23 have to be used for calculating the coefficients α, β and these channels 23b-23d are not provided for the data transmission anyway. This mode is also referred to as adaptive compensation hereinafter.

Further modified arrangement of an RFI compensator 19 according to the invention is illustrated below with reference to the block diagram in FIG. 5. In contrast to the exemplary embodiments in FIGS. 3 and 4, in FIG. 5 the reference channel used for a useful channel to be compensated is always the channel respectively adjacent to this channel. For frequencies above the interference frequency this is the next lower frequency channel, and for frequencies below the interference frequency this is the next higher frequency channel. In this case, the reference channel does not have to remain unused either, but rather may also be used for the data transmission. Since the reference channel is now derived from a used channel, the interference component of the narrowband interference that is required for the correction has to be generated with the aid of a decision unit 41, which estimates the transmitted symbols.

Firstly, the first useful channel 43 ($i_0$-Δ-1) directly below the observation interval 23, that is to say below the reference channel 42 ($i_0$-Δ) is compensated. In this case, however, the compensation is effected directly downstream of the frequency range equalizer 40. In the frequency range equalizer 40, the signal of said useful channel 43 is multiplied by a complex value in order, in a known manner, to compensate for the distortions present in the useful channel 43. Therefore, it is expedient for the reference channel 42, which in this case represents the first unused channel 42 in the observation region 23, likewise to be weighted by means of the frequency range equalizer 40.

For the compensation, the values of the reference channel 42 are weighted with the coefficients a(n,m)-d(n,m) in multiplication devices 44 and—analogously to the exemplary embodiment of FIG. 3—the value thus determined is subtracted from the corresponding values of the useful channel 43 in the combination device 45, real and imaginary parts of the individual channels 42, 43 again being treated separately here, too. After this compensation for the useful channel 43, in which the channel 42 functioned as a reference channel, the value actually transmitted is estimated with the aid of a decision unit 41. The interference caused by the narrowband interference in the useful channel 43 is then obtained by forming the difference between the values prior to the compensation, that is to say downstream of the frequency range equalizer 40, and downstream of the decision unit 41. For this difference formation, provision is made in each case of a device 46 for difference formation that is designed specially for this. The values thereby obtained may once again be used as reference values for the compensation of the next channel 47 ($i_0$-Δ-2); that is to say that for said channel 47 the channel 43 ($i_0$-Δ-1) adjacent thereto is then used as reference channel.

Figure 5:
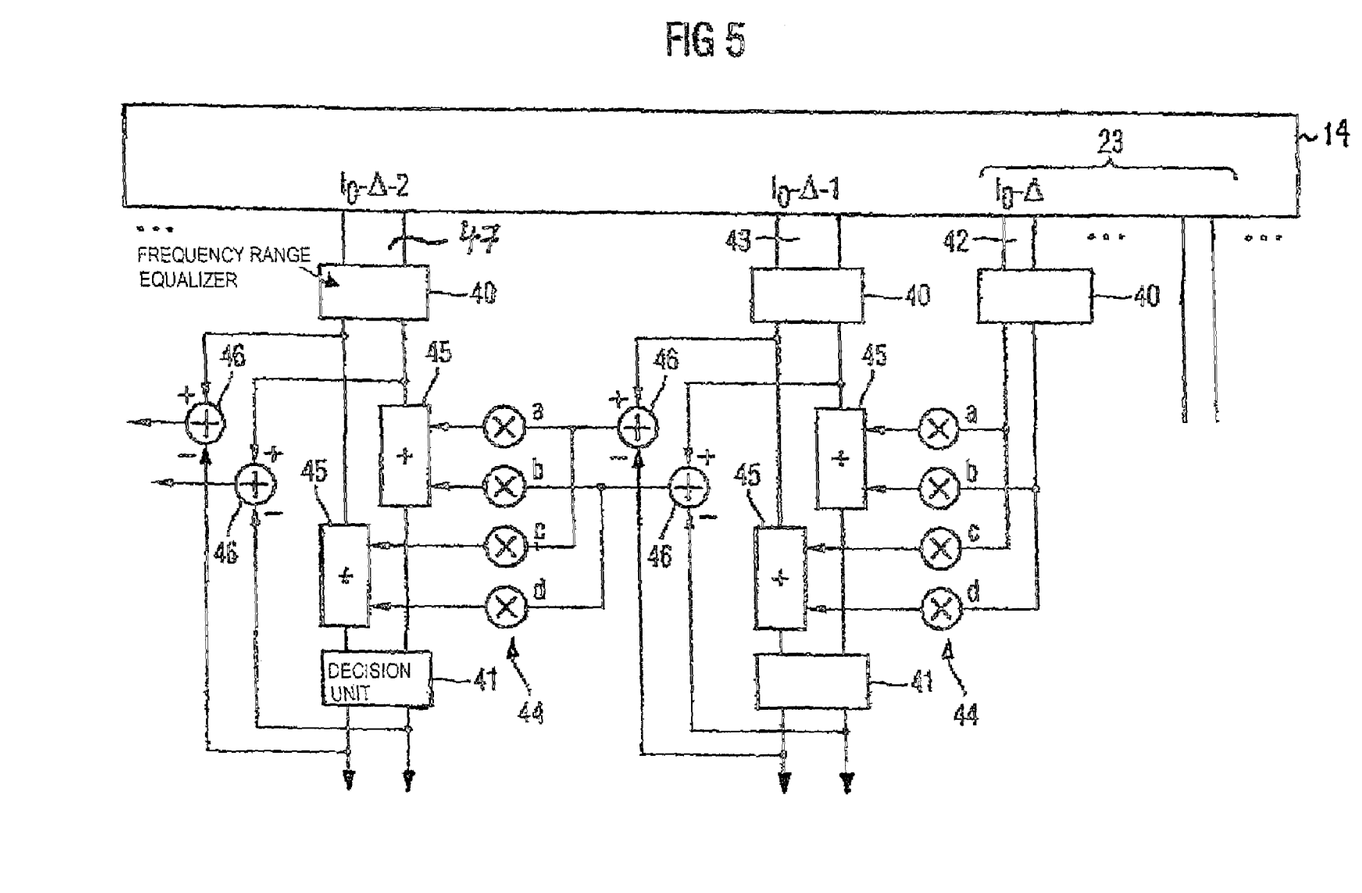
FIG. 5 shows a block diagram for a third, particularly preferred exemplary embodiment of an RFI compensator according to the invention.

The arrangement in FIG. 5 yields a very low residual interference overall, particularly in the vicinity of the interference frequency.

In a modification that is not illustrated, the coefficients a(n,m)-d(n,m) may also be calculated in closed form in the case of this arrangement in FIG. 5. A compensator with only one reference channel is again prescribed in this case. However, the reference channel is the adjacent channel in this case. Moreover, the frequency range equalizer 40 has to be taken into consideration for the calculation of the demodulated values. These represent in each case the reciprocal of the channel transfer function at the corresponding frequency and are likewise calculated during the connection set-up.

The coefficients of the RFI compensator according to the invention in FIG. 5 with the different variants can advantageously also be adjusted during the actual data transmission, since—as assumed in the introduction—the interference acts permanently. This is particularly expedient when the properties of the interference signal change over the course of time, for example on account of a slight alteration of the carrier frequency of the interference source. For this purpose, an error signal is to be generated during data operation for each channel, said error signal resulting from the difference between the values upstream and downstream of the decision unit. This does not involve the same error signal that is required for the compensation with the above-described modified compensator structure with the adjacent carriers as reference channels. The coefficients of the RFI compensator are adapted by means of this error. The adaptation algorithm used may be, by way of example, the LMS algorithm (LMS=Least Mean Square), such as is employed for example for setting equalizer coefficients or the coefficients of an echo compensator. Simplified variants of the LMS algorithm in which only the signs of the signals are processed are also possible.

The effectiveness and the advantages of the above-described compensation method according to the invention are described below on the basis of some simulation examples that were carried out by the applicant.

For the simulation, DMT frames 19a are generated in the time domain, said frames containing only interference signals, but no useful data, for the purpose of better being able to check the effectiveness of the method according to the invention. Said DMT frames 19a are superposed with a suitable window function, transformed into the frequency domain by means of FFT, and used as input signals for the RFI compensator.

The narrowband interference signal $u_{RFI}(k)$ is calculated in the following manner:

$$u_{RFI}(k) = g \cdot \cos\left(2 \cdot \pi \cdot \frac{f_0}{f_A} \cdot k\right) + (1-g) \cdot \left(u_{TP}(k) \cdot \cos\left(2 \cdot \pi \cdot \frac{f_0}{f_A} \cdot k\right)\right)$$

In this case, the signal $u_{TP}(k)$ represents a narrowband baseband noise signal (low-pass filter signal). k designates the time index, $f_0$ designates the carrier frequency of the amplitude modulation, and $f_A$ designates the sampling frequency of the time-discrete narrowband noise signal.

An amplitude-modulated double-sideband signal with carrier adjunct is thus obtained. In this case, the parameter g can be used to set the strength of the added carrier. With g=1, only the carrier signal is obtained as interference signal, and with g=0 a pure double-sideband signal without a carrier adjunct is obtained.

Figure 6A:
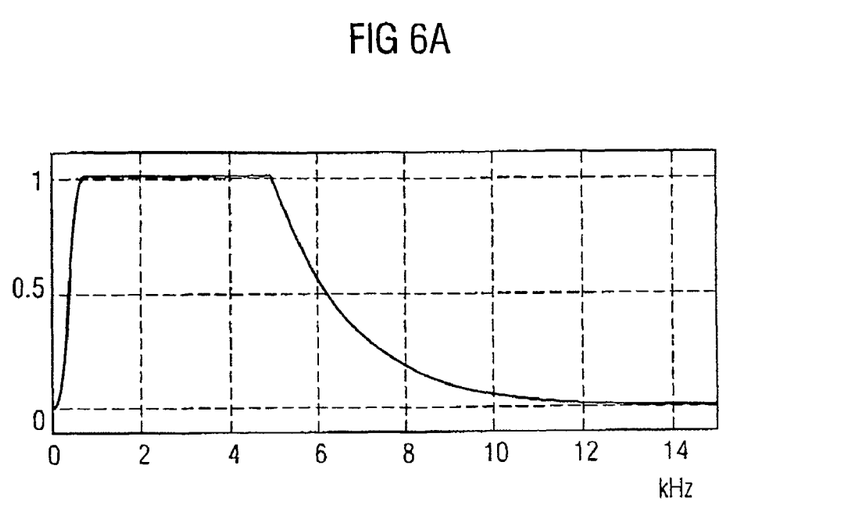
FIG. 6 shows a narrowband interference signal for the simulation example considered.
Figure 6B:
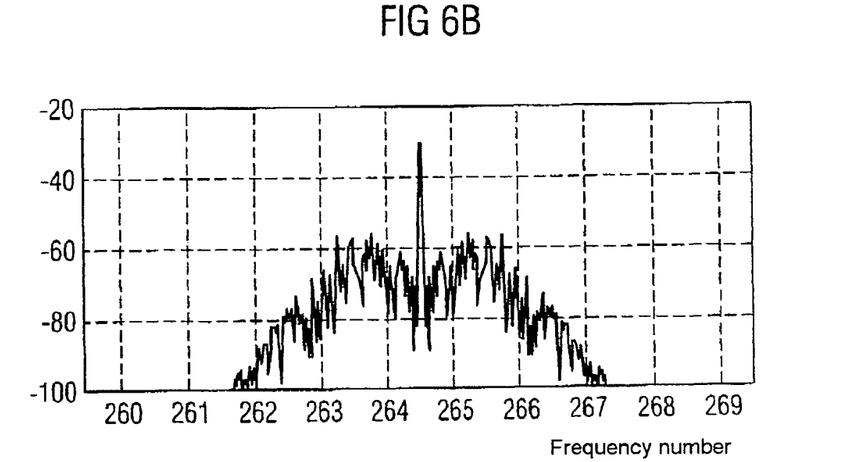
Figure 6C:
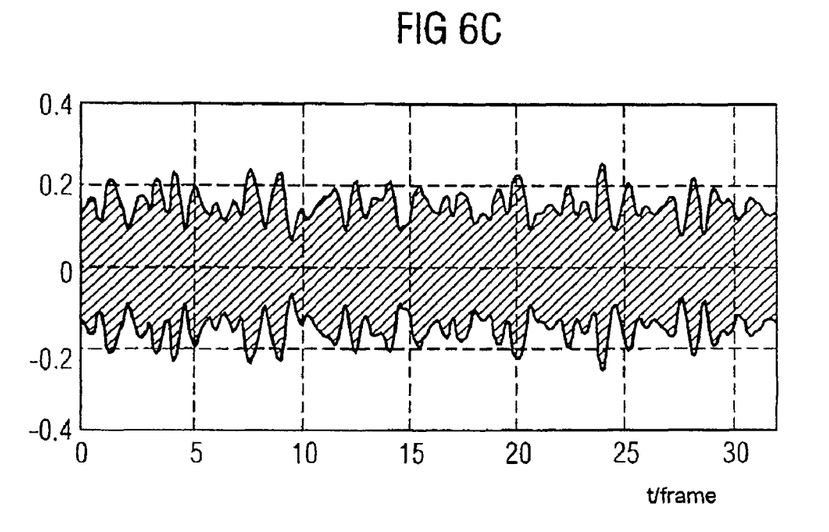

FIG. 6 shows the predetermined spectral mask in the low-pass filter range (FIG. 6(a)), the spectral power density of the narrowband interference signal (FIG. 6(b)), and an excerpt from the time signal of the narrowband interference (FIG. 6(c)).

Figure 7:
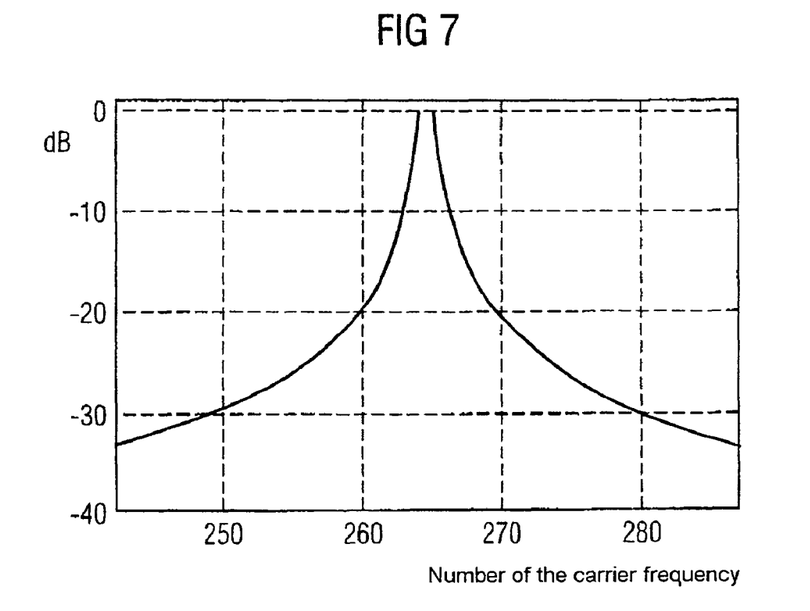
FIG. 7 shows a spectrum of the interference signal after demodulation (FFT) in the receiver in the vicinity of the interference frequency.

For the simulation example considered here let g=0.15. $f_0=264.5 \cdot \Delta f$ is chosen as the carrier frequency for the interference. This carrier frequency thus lies precisely between two carrier frequencies used for DMT data transmission. A worst-case exemplary situation therefore results here with regard to an interference influence on the adjacent channels. In this case, there is obtained not just a maximum at one frequency after the FFT in the receiver, but rather interference components of approximately identical magnitude in each case at two adjacent frequencies. This also becomes clear from FIG. 7, which illustrates the interference spectrum after the demodulation (FFT) in the receiver in the vicinity of the interference frequency.

It is expedient, therefore, to choose the range between the carrier frequencies 264−Δ and 265+Δ for the observation region. Furthermore, the simulation example assumes an overlap region for the windowing before the FFT in the receiver of 4 values, the length of an FFT block being 1024 values. The entire frequency range after the demodulation therefore ranges from the frequency number 0 up to the frequency number 512.

Firstly, an RFI compensator with a single reference channel without modification is considered. As the reference channel in this case, the channel having the frequency number 264−Δ is used for the frequency channels to be compensated below the interference frequency and the channel having the frequency number 265+Δ is used for the frequency channels above the interference frequency.

For the calculation of the compensator coefficients, firstly 128 FFT blocks (frames) were simulated and in each case transformed into the frequency domain. With the values resulting therefrom, the coefficients for the interference compensator were then determined according to the relationships specified above. With the resulting coefficients, a further simulation was subsequently carried out over 256 FFT frames and the average residual error was determined.

Figure 8A:
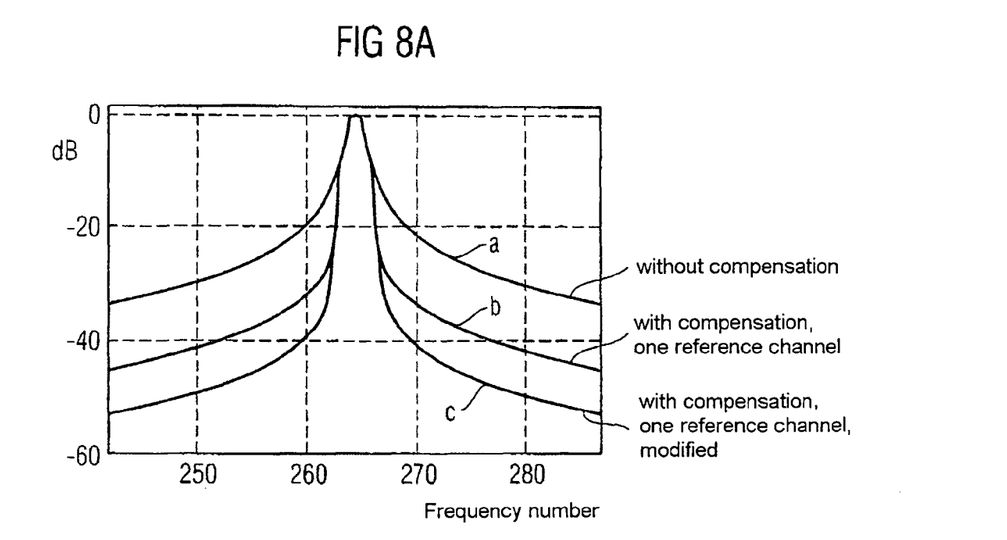
FIG. 8 shows simulated residual interference in dB for RFI compensation devices according to the invention with a single reference channel in comparison with an arrangement without compensation.
Figure 8B:
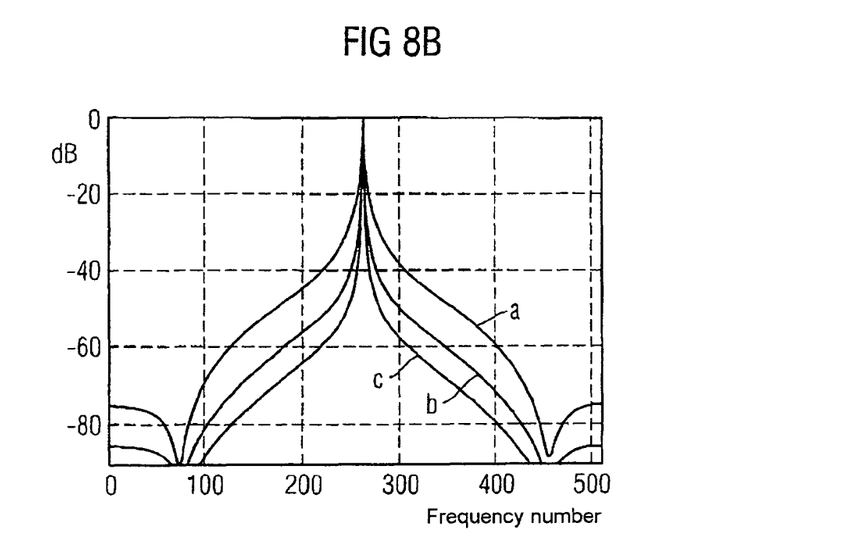

FIG. 8 shows the resulting residual interference in dB for an RFI compensator according to the invention with a single reference channel. In this case, FIG. 8(a) illustrates the frequency scale in the region of the interference frequency in an expanded fashion, so that the behaviour in direct proximity to the interference frequency can be better discerned.

The upper curve (curve a) shows the interference behaviour after the FFT without compensation. The middle curve (curve b) in FIG. 8 shows the resulting residual error with a simple RFI compensator with a single reference channel. Δ=1 was chosen in this case. The observation region thus contains a total of four frequency channels. The respective bottommost curve (curve c) in FIG. 8 shows the residual error produced with an interference compensator with a modified reference channel. In this case, the value k=0.1 was chosen for the factor k defined in FIG. 4.

In comparison with the configuration without compensation (curve a), the simple RFI compensator according to the invention (curve b) advantageously yields a reduction of the interference by up to 12 dB in a wide frequency range around the interference frequency.

The RFI compensator modified according to the invention (curve c), for example in accordance with the examples in FIG. 4, which RFI compensator likewise uses only a single reference channel, results in a further reduction of the residual error by approximately 8 dB, so that overall the interference can be reduced by up to 20 dB here.

Although the present invention has been described above on the basis of preferred exemplary embodiments, it is not restricted thereto, but rather can be modified in diverse ways.

In particular, the invention is not restricted to the above data transmission systems and methods, but rather can be extended for the purpose of RFI compensation to all systems and methods based on multicarrier data transmission. In particular, the invention shall not be restricted to VDSL data transmission, but rather can be extended to all xDSL data transmissions. Mobile applications such as DAB (=Digital Audio Broadcasting) or DVB-T (=Digital Video Broadcasting-Terrestrial) or OFDM-based WLAN applications (Wireless Local Area Network) are also conceivable.

It goes without saying that the elements of the compensation device according to the invention and also the specified FFT modules, IFFT modules and filters are conventional hardware components which, however, can also be realized in terms of software. Instead of an FFT or IFFT transformation, it is also possible to use any other transformations suitable for multicarrier transmission.

In particular, the invention shall not be restricted to the above numerical specifications, but rather can be modified in any desired manner within the scope of the invention and expert knowledge.

In the present patent application, the term "compensation of RFI interference" is also to be understood as "reduction of RFI interference".

Although modifications and changes may be suggested by those skilled in the art, it is the intention of the inventor to embody within the patent warranted heron all changes and modifications as reasonably and properly come within the scope of his contribution to the art.

I claim as my invention:

1. A method for generating a compensation signal for the compensation of at least one RFI (Radio Frequency Interference) interference signal that, in a DMT (Discrete Multi-tone) transmission, is permanently superposed on a received DMT reception signal being divided into a multiplicity of channels comprising the following steps:
   providing a single reference channel as said reference channel for all data channels to be compensated from said multiplicity of channels;
   said multiplicity of channels comprising a first portion provided as data channels for the data transmission and second portion that defines an observation region provided for data transmission;
   providing channel-specific coefficients for at least one of said data channels to be compensated;
   said channel-specific coefficients providing a correlation of said RFI interference signal being superposed on said data signal relative to said reference channel; and
   said received DMT reception signal for generating a compensation signal, weighting and summing said received DMT reception signals with said channel-specific coefficients per DMT frame and for each of said data channels to be compensated;
for the generation of said compensation signals, combining a plurality of unused channels from said observation region as said single reference channel;
using said single reference channel from said observation region for generating said compensation signal;
calculating said compensation signal anew for each DMT frame,
wherein calculating said compensation signal is performed only for those channels to be compensated outside said observation region, if at least one of the absolute value of an interference power density of said RFID interference signal or of said compensation signal lies above a predefined threshold.

2. The method of claim 1, wherein said compensation signal has a real and an imaginary part which are treated separately.

3. The method of claim 1, wherein said channel-specific coefficients have a real and an imaginary part the method of claim 1 further comprising assigning said channel-specific coefficients to the respective of said real part and imaginary part of said data channel to be compensated depending on said real part and said imaginary part of said respective reference channel, according to the following designation scheme:

|  |  | Reference channel n | |
|---|---|---|---|
|  |  | Real part | Imaginary part |
| Channel m to be compensated | Real part | a (n, m) | b (n, m) |
|  | Imaginary part | c (n, m) | d (n, m) | wherein a (n, m), b (n, m), c (n, m), and d (n, m) are channel-specific weighting coefficients,
wherein m designates an arbitrary compensation channel outside an observation region, and
wherein n is the number of rows of the matrices.

4. The method of claim 1, comprising determining said channel-specific coefficients during a test operating mode in which no data are transmitted and received.

5. The method of claim 1, comprising determining said channel-specific coefficients adaptively during said data transmission.

6. The method of claim 1, wherein four channel-specific coefficients are determined and stored for each data channel to be compensated.

7. The method of claim 1, using an adjacent channel of said data channel to be compensated as said reference channel.

8. The method of claim 7, comprising using one of said data channel as said reference channel for generating said compensation signal;
wherein an interference component of said reference channel that is required for the compensation being generated with the aid of a decision device estimates the compensated reception signal of said respective reference channel, and is subtracted from the non-compensated frequency-equalized reception signal of said respective reference channel.

9. The method according claim 1, comprising generating a compensated reception signal by subtracting said compensation signal from said received DMT reception signal superposed with said interference signal.

10. The method of claim 1 wherein said predefined threshold is in the range of between 60 dB and 45 dB.

11. The method of claim 10, wherein said predefined threshold is 50 dB.

12. The method of claim 1, wherein the width of said observation region used is chosen in a manner dependent on at least of the type of said interference signal or on the type of windowing used.

13. The method of claim 1, wherein the width of said observation region used is adjustable.

14. A receiver circuit for a DMT (Discrete Multi-tone) data transmission system, comprising:
a reception circuit for receiving a DMT reception signal;
wherein said received DMT reception signal is divided into a multiplicity of channels and at least one RFI (radio Frequency Interference) interference signal is permanently superposed on said received DMT reception signal;
an FFT (fast Fourier Transformation) device, which is connected downstream of said reception circuit and subjects said DMT reception signal to an FFT for the purpose of attaining spectral values;
an RFI compensator, which is connected downstream of said FFT device and is configured to carry out a compensation of said RFI interference signal superposed on said received DMT reception signal, according to the following steps:
a single reference channel as said reference channel for all data channels to be compensated from said multiplicity of channels;
said multiplicity of channels comprising a first portion provided as data channels for the data transmission and a second portion defines an observation region provided for data transmission;
providing channel-specific coefficients for at least one of said data channels to be compensated;
said channel-specific coefficients specifying a correlation of said RFI interference signal being superposed on said data channel in respect of said reference channel; and said received DMT reception signal for generating a compensation signal, weighting and summing said received DMT reception signals with said channel-specific coefficients per DMT frame and for each of said data channels to be compensated,
for the generation of said compensation signals, combining a plurality of unused channels from said observation region as said single reference channel;
using said single reference channel from said observation region for generating said compensation signal,
wherein said compensation signal is calculated anew for each DMT frame, and
wherein said compensation signal is generated only for those channels to be compensated outside said observation region, if at least one of the absolute value of an interference power density of said RFID interference signal or of said compensation signal lies above a predefined threshold.

15. The circuit of claim 14, wherein said compensation signal has a real and an imaginary part which are treated separately.

16. The circuit of claim 14, wherein said channel-specific coefficients have a real and an imaginary part the method of claim 14 further comprising assigning said channel-specific coefficients to the respective of said real part and imaginary part of said data channel to be compensated, depending on said real part and said imaginary part of said respective reference channel, according to the following designation scheme:

|  |  | Reference channel n | |
| --- | --- | --- | --- |
|  |  | Real part | Imaginary part |
| Channel m to be compensated | Real part | a (n, m) | b (n, m) |
|  | Imaginary part | c (n, m) | d (n, m) | wherein a (n, m), b (n, m), c (n, m), and d (n, m) are channel-specific weighting coefficients,
wherein m designates an arbitrary compensation channel outside an observation region, and
wherein n is the number of rows of the matrices.

17. The circuit of claim 14, wherein said channel-specific coefficients during a test operating mode in which no data are transmitted and received.

18. The circuit claim 14, wherein said channel-specific coefficients are determined adaptively during said data transmission.

19. The circuit of claim 14, wherein four channel-specific coefficients are determined and stored for each data channel to be compensated.

20. The circuit of claim 14, wherein an adjacent channel of said data channel to be compensated is used as said reference channel.

21. The circuit of claim 20, wherein one of said data channel as said reference channel for generating said compensation signal;
an interference component of said reference channel that is required for the compensation being generated with the aid of a decision device estimates the compensated reception signal of said respective reference channel, and is subtracted from the non-compensated frequency-equalized reception signal of said respective reference channel.

22. The circuit of claim 14, wherein a compensated reception signals is generated by subtracting said compensation signal from said received DMT reception signal superposed with said interference signal.

23. The circuit of claim 14, wherein said predefined threshold is in the range of between 60 dB and 45 dB.

24. The circuit of claim 23, wherein said predefined threshold is 50 dB.

25. The circuit of claim 14, wherein the width of said observation region used is chosen in a manner dependent on at least of the type of said interference signal or on the type of windowing used.

26. The circuit of claim 14, wherein the width of said observation region used is adjustable.

27. The circuit of claim 14, wherein said RFI compensator comprises a storage device, in which said channel-specific coefficients are stored.

* * * * *